United States Patent
Teremy et al.

(10) Patent No.: US 6,380,915 B1
(45) Date of Patent: Apr. 30, 2002

(54) EL BACKLIGHT DRIVE CIRCUIT FOR LCD DISPLAY

(75) Inventors: Paul Teremy, Rochester; Dennis R. Zander, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/286,176

(22) Filed: Apr. 5, 1999

(51) Int. Cl.[7] .................................................. G09G 3/30
(52) U.S. Cl. ........................................... 345/76; 345/80
(58) Field of Search ......................... 349/71; 396/287; 315/169.3; 354/416

(56) References Cited

U.S. PATENT DOCUMENTS

| | | | | |
|---|---|---|---|---|
| 4,082,983 A | * | 4/1978 | Adams, Jr. ................... | 315/241 |
| 4,839,686 A | * | 6/1989 | Hosomizu et al. .......... | 354/416 |
| 4,975,692 A | | 12/1990 | Tateyama | |
| 5,184,117 A | | 2/1993 | Gauthier | |
| 5,440,208 A | * | 8/1995 | Uskali et al. ............. | 315/169.3 |
| 5,747,938 A | * | 5/1998 | Beard ........................ | 315/169.3 |
| 5,815,228 A | * | 9/1998 | Flynn ........................... | 349/71 |
| 5,818,172 A | | 10/1998 | Lee | |
| 6,115,557 A | * | 9/2000 | Maeda et al. ................ | 396/287 |

\* cited by examiner

Primary Examiner—Steven Saras
Assistant Examiner—Srilakshmi K. Kumar
(74) Attorney, Agent, or Firm—Francis H. Boos, Jr.; Roland R. Schindler, II

(57) ABSTRACT

An EL backlight device drive circuit useful with a camera LCD display. The backlight device is connected to the flash storage capacitor of the camera flash circuit for its energy source. Pulsing of the DC voltage from the storage capacitor is accomplished by a switching transistor coupled across the EL backlight device driven from a fixed duty cycle pulse source via an AC coupled pulse differentiating circuit. The AC coupled circuit reduces the On time duty cycle of the transistor relative to the pulse train duty thereby increasing the ON time duty cycle of the EL backlight device to increase its light output operating efficiency. With increased operating efficiency, a higher value coupling resistor is inserted between the EL backlight device and flash storage capacitor to thereby limit the AC current through the EL backlight device to a predetermined safety operating level.

17 Claims, 2 Drawing Sheets

EL BACKLIGHT DRIVE CIRCUIT FOR LCD DISPLAY

FIELD OF THE INVENTION

This invention relates generally to the field of camera electronic displays and in particular to a drive circuit for electroluminescent (EL) backlights used with liquid crystal display (LCD) camera displays.

BACKGROUND OF THE INVENTION

LCD displays are commonly used on cameras to provide film and camera operational information to the camera user. Since LCD displays do not generate light, it is common to use backlighting to make the LCD display visible under low ambient light conditions. EL panels are useful for this purpose, particularly in the case of cameras, due to their relatively low power consumption. A drawback in the use of EL backlighting relates to the requirement for an AC power source to activate the EL panel thereby necessitating a DC/AC converter of some sort to convert the available battery power to the AC drive needed to operate the EL backlight. In the case of a camera with a microprocessor controller, a 50% duty cycle switching output is available from the microprocessor that can be used to switch a DC/AC converter. This is not an optimum duty cycle for EL backlight power since, the higher the ON time for EL backlight, the higher the light output. While the duty cycle can be changed by reprogramming the microprocessor, it adds to the microprocessor's program overhead and is thus costly to implement.

SUMMARY OF THE INVENTION

In accordance with the invention, an EL backlight drive circuit for a camera display is provided which comprises a flash circuit having a high voltage flash storage capacitor; an EL backlight device connected to the flash storage capacitor such that the flash storage capacitor serves as a DC power source for the EL backlight device; and a source of a pulse train having a fixed first duty cycle. The drive circuit also comprises a switching circuit including a duty cycle changing circuit and an electronic switching device coupled between said pulse train source and said EL backlight device and operative to convert DC voltage from said flash storage capacitor to pulsed voltage across said EL backlight device at a second duty cycle that is higher than the first duty cycle of the source pulse train. An advantage of the drive circuit of the invention is that a simple 50% duty pulse train from a camera microprocessor or ASIC can be employed as the pulse source to switch the DC voltage from the flash capacitor while achieving a significant improvement in EL backlight operating efficiency at a higher duty cycle rate, such as a 90% on time.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
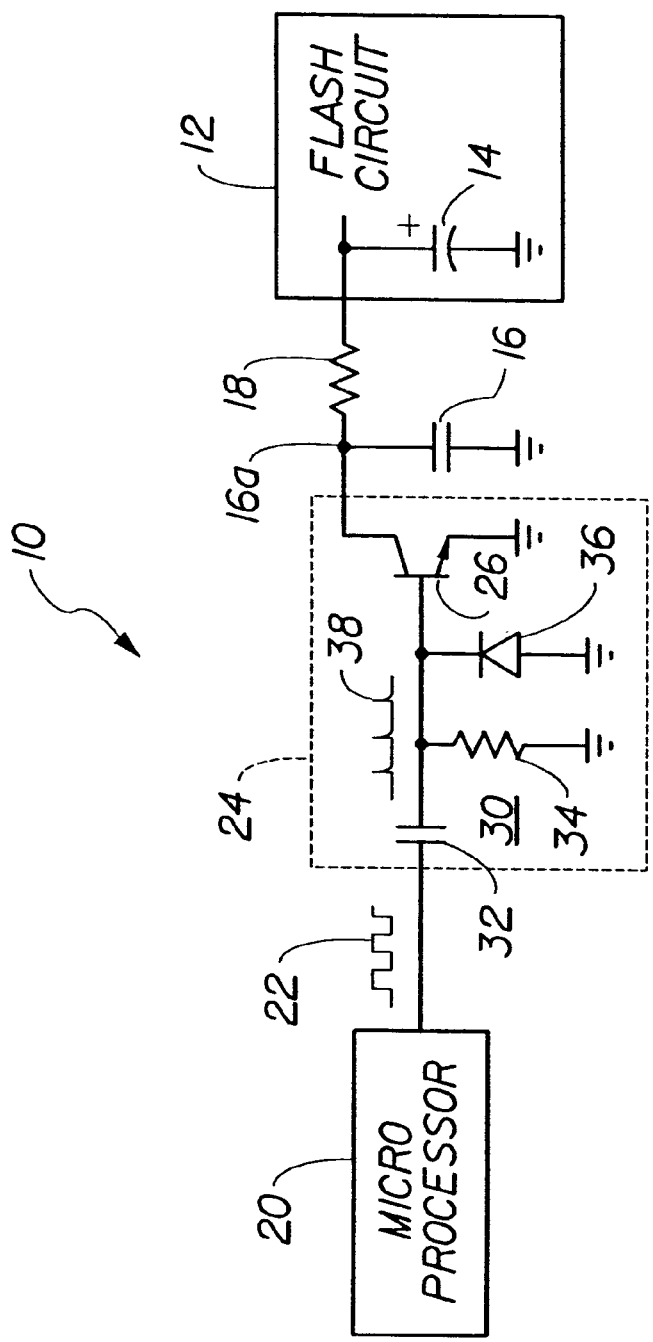
FIG. 1 is a diagram of the EL backlight drive circuit of the invention.

In FIG. 1 an EL backlight drive circuit 10 for a camera display comprises a flash circuit 12 having a high voltage flash storage capacitor 14 and an EL backlight device 16 connected via current limiting resistor 18 to the flash storage capacitor such that the flash storage capacitor serves as an operating power source for the EL backlight device. As described further below, a feature of the invention is that the value of resistor 18 can be set at a value which limits AC current through the EL backlight storage device 16 to a predetermined maximum safety level established as a standard IEC 950 by the International Electrotechnical Commission.

Microprocessor 20 comprises a source of a pulse train 22 having a frequency of 1 Khz and a fixed first duty cycle, typically a 50%, that is to say, a pulse train having positive and negative excursions of equal pulse widths or durations. Alternatively, an ASIC may be used to provide the fixed duty cycle pulse train. A switching circuit 24 coupled between the pulse train source 20 and EL backlight device 16 is operative to convert DC voltage from the flash storage capacitor 14 to a variable or pulsed voltage across the EL backlight device as is required to cause the EL device to illuminate. For this purpose, the switching circuit 24 includes an electronic switching device comprising NPN transistor 26 having emitter-collector terminals connected across EL backlight device 16 to shunt the EL backlight device at a periodic rate determined by a pulsed input applied to the base of the transistor. Differentiation circuit 30, including capacitor 32 and resistor 34, comprises an AC coupling circuit coupled from pulse source 20 to the base of transistor 26. Differentiation circuit 30 functions to change the duty cycle of the pulse train 22 to a train of narrow pulses 38 of significantly reduced duty cycle as compared to the duty cycle of the input pulse train 22. Diode 36 is a clamping diode that shunts negative-going differentiated pulses to ground as a protective feature for the emitter-base junction of transistor 26.

Figure 2:
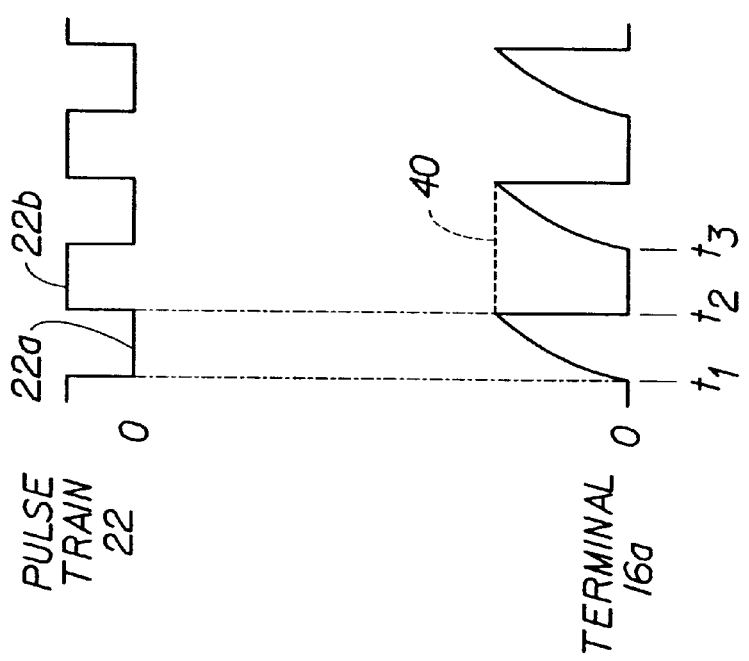
FIG. 2 is a diagram of signal waveforms for a prior art drive circuit.

FIG. 2 illustrates the operation of the EL backlight drive circuit without the benefit of the differentiation circuit 30 in the switching circuit 24. In this case, the 50% duty cycle pulse train 22 from microprocessor 20 would be applied directly to the base of transistor 26. The low level pulses 22a turn transistor 26 off during the first half $t_1$–$t_2$ of the total pulse cycle period $t_1$–$t_3$ allowing terminal 16a the EL backlight device, which acts as a capacitor, to charge during this period toward the voltage of the flash capacitor 14 reaching level 40 by the time transistor 26 is turned on to shunt the EL device. During the second half $t_2$–$t_3$ of the cycle, while transistor 26 is turned on, the upper terminal 16a of the backlight device is shunted to ground through the emitter collector terminals of the transistor. The result is that the EL backlight device is illuminated at a relatively inefficient duty cycle rate of 50%.

Figure 3:
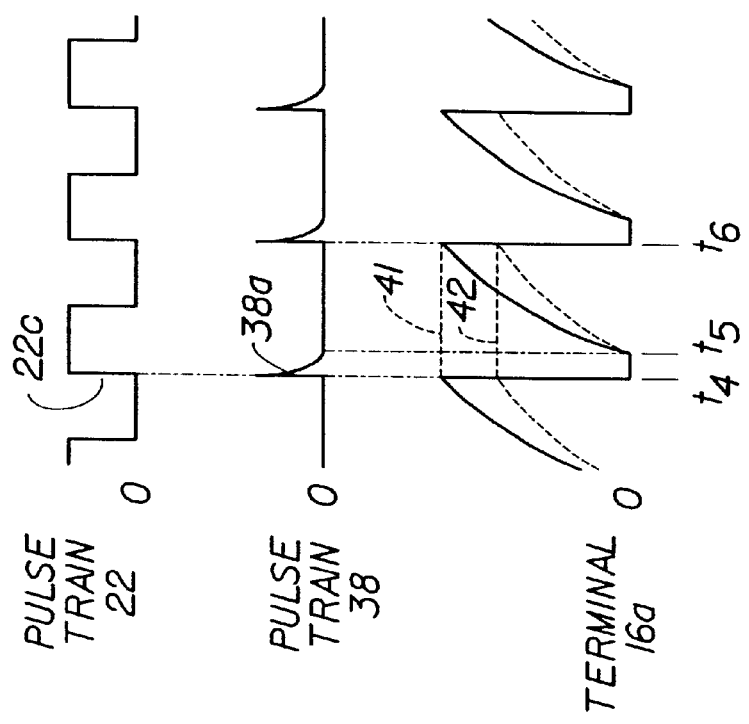
FIG. 3 is a diagram of signal waveforms for a drive circuit of the present invention.

In FIG. 3, the effect of inserting differentiation circuit 30 between the pulse source 20 and base of transistor 26 to change the duty cycle rate of the pulse train 22 is illustrated. Positive transitions 22c in the applied pulse train 22 are differentiated by circuit 30 to produce short duration voltage pulses 38a across resistor 34 which are applied to the base of transistor 26. Diode 36 removes differentiated pulses generated by negative transitions in pulse train 22. The component values of capacitor 32 is suitably chosen to effect a preferred reduced duty cycle of 10%. The value of resistor 34 is chosen to establish a sharp turn-off of transistor 26. The effective pulse width $t_4$–$t_5$ of the differentiated pulses 38a applied to the base of transistor 26 turns the transistor on for only 10 percent of the original input pulse cycle $t_4$–$t_6$. As a result, the off time period $t_5$–$t_6$ of transistor 26 and the corresponding charging period at terminal 16a is extended to 90% of the pulse cycle time of the input pulse train 22. This extended charging period allows terminal 16a to charge to a higher charge level 41 which increases the output light level of the EL backlight device and therefore its operating efficiency. Because of the increased operating efficiency, it is possible to reduce the pulse current through the EL backlight device by increasing the value of resistor 18 bringing the peak charge level back to a level 42 which produces a desired illumination from the display while at the same time reducing the peak pulse current through the EL backlight device to limited value which is at or below the established safety limit for use in a camera. While an operating duty cycle of 90% for an ON connection time of the EL device to the flash capacitor is described herein, it will be appreciated that other extended duty cycles may be preferred depending on the nature of the EL backlight device.

The invention has been described in detail with particular reference to certain preferred embodiments thereof, but it will be understood that variations and modifications can be effected within the spirit and scope of the invention.

PARTS LIST

10 EL backlight drive circuit
12 camera flash circuit
14 flash storage capacitor
16 EL backlight device
18 resistor
20 micro-processor
22 input pulse train
24 switching circuit
26 switching transistor
30 differentiating circuit
32 capacitor
34 resistor
36 clamping diode
38 differentiated pulse train
40–42 peak charging levels

What is claimed is:

1. An EL backlight drive circuit for a camera display comprising:

a flash circuit having a high voltage flash storage capacitor;

an EL backlight device connected to the flash storage capacitor such that the flash storage capacitor serves as a DC power source for the EL backlight device;

a source of a pulse train having a fixed first duty cycle;

a switching circuit including a duty cycle changing circuit and an electronic switching device coupled between said pulse train source and said EL backlight device and operative to convert DC voltage from said flash storage capacitor to pulsed voltage across said EL backlight device at a second duty cycle that is higher than the first duty cycle of the source pulse wherein said duty cycle changing circuit differentiates the pulse train.

2. The EL backlight drive circuit of claim 1 wherein said duty cycle changing circuit is an AC coupling circuit.

3. The EL backlight drive circuit of claim 1 wherein said electronic switching device is a transistor having base, emitter and collector terminals, the base terminal being coupled via said duty cycle changing circuit to said pulse train source and the collector-emitter terminals coupled across said EL backlight device, the duty cycle changing circuit being operative to render said transistor conductive to shunt said EL backlight device at a duty cycle that is reduced from said first duty cycle;

whereby said second duty cycle comprises charging time of the EL backlight device from the flash capacitor is increased over said duty cycle of said pulse train source.

4. The EL backlight drive circuit of claim 1 or 3 wherein said first duty cycle is about 10% and said second duty cycle is about 90%.

5. The EL backlight drive circuit of claim 1 or 3 wherein the connection of said EL backlight device to said flash storage capacitor includes a resistor having a value which limits AC current through said EL backlight storage device to a predetermined maximum safety level.

6. An EL backlight drive circuit for a camera display comprising:

a flash circuit having a high voltage flash storage capacitor;

an EL backlight device connected to the flash storage capacitor such that the flash storage capacitor serves as a DC power source for the EL backlight device;

a source of a pulse train having a fixed first duty cycle;

a switching circuit including a duty cycle changing circuit and an electronic switching device coupled between said pulse train source and said EL backlight device and operative to convert DC voltage from said flash storage capacitor to pulsed voltage across said EL backlight device at a second duty cycle that is higher than the first duty cycle of the source pulse train wherein said electronic switching device is a transistor having base, emitter and collector terminals, the base terminal being coupled via said duty cycle changing circuit to said pulse train source and the collector-emitter terminals coupled across said EL backlight device, the duty cycle changing circuit being operative to render said transistor conductive to shunt said EL backlight device at a duty cycle that is reduced from said first duty cycle;

whereby said second duty cycle comprises charging time of the EL backlight device from the flash capacitor is increased over said duty cycle of said pulse train source.

7. The EL backlight drive circuit of claim 6 wherein said duty cycle changing circuit is an AC coupling circuit.

8. The EL backlight drive circuit of claim 6 wherein said duty cycle changing circuit is a pulse differentiating circuit.

9. The EL backlight drive circuit of claim 6 wherein said first duty cycle is about 10% and said second duty cycle is about 90%.

10. The EL backlight drive circuit of claim 6 wherein the connection of said EL backlight device to said flash storage capacitor includes a resistor having a value which limits AC current through said EL backlight storage device to a predetermined maximum safety level.

11. An EL backlight drive circuit for a camera display comprising:

a flash circuit having a high voltage flash storage capacitor;

an EL backlight device having a capacitance for storing electrical charge and connected to the flash storage capacitor such that the flash storage capacitor charges the EL backlight device;

a source of a pulse train having a fixed first duty cycle;

a switching circuit including a duty cycle changing circuit and an electronic switching device coupled between said pulse train source and said EL backlight device and operative conductive to discharge stored electrical charge from said EL backlight device at a second duty cycle that is lower then the first duty cycle of the source pulse train.

12. The EL backlight drive circuit of claim 11 wherein said duty cycle changing circuit is an AC coupling circuit.

13. The EL backlight drive circuit of claim 11 wherein said duty cycle changing circuit is a pulse differentiating circuit.

14. The EL backlight drive circuit of claim 11 wherein said electronic switching device is a transistor having base, emitter and collector terminals, the base terminal being coupled via said duty cycle changing circuit to said pulse train source and the collector-emitter terminals coupled across said EL backlight device, the duty cycle changing circuit being operative to render said transistor conductive to shunt said EL backlight device at a duty cycle that is reduced from said first duty cycle;

whereby said second duty cycle comprises charging time of the EL backlight device from the flash capacitor is increased over said duty cycle of said pulse train source.

15. The EL backlight drive circuit of claims 11, 12, 13, or 14, wherein said first duty cycle is about 10% and said second duty cycle is about 90%.

16. The EL backlight drive circuit of claim 11, 12, 13, or 14, wherein the connection of said EL backlight device to said flash storage capacitor includes a resistor having a value which limits AC current through said EL backlight storage device to a predetermined maximum safety level.

17. The EL backlight drive circuit of claim 14 wherein the duty cycle changing circuit comprises a capacitor having a terminal electrically connected to the source pulse train and another terminal electrically connected in parallel to a resistor connected to a ground, to a diode connected to a ground and arranged to remove differentiated pulses generated by negative transitions in said pulse train and to the base of the transistor.

* * * * *